United States Patent [19]

Leonard et al.

[11] Patent Number: 4,855,018

[45] Date of Patent: Aug. 8, 1989

[54] PROCESS FOR ETCHING POLYTETRAFLUOROETHYLENE

[75] Inventors: Elizabeth C. Leonard, Cambridge, Mass.; Lewis Erwin, Winnetka, Ill.

[73] Assignee: Massachusetts Institute of Technology, Cambridge, Mass.

[21] Appl. No.: 80,317

[22] Filed: Jul. 31, 1987

[51] Int. Cl.[4] ............... B44C 1/22; B29C 37/00; C08F 14/26; C08F 114/26
[52] U.S. Cl. .................... 156/646; 156/668; 525/326.2; 525/367
[58] Field of Search .............. 525/326.2, 326.4, 367; 156/646, 628, 646, 668; 427/430.1, 248.1

[56] References Cited

U.S. PATENT DOCUMENTS 3,967,018  6/1976  Jansta et al. ............... 428/422

Primary Examiner—Joseph L. Schofer
Assistant Examiner—John J. Guarriello
Attorney, Agent, or Firm—Hamilton, Brook, Smith & Reynolds

[57] ABSTRACT

A process for etching polytetrafluoroethylene (PTFE) is disclosed herein which comprises defluorinating the surface layer of PTFE. The process includes exposing a sample of PTFE to the vapors of an alkali metal such that a layer of the fluoride of the alkali metal is formed on the surface of the PTFE sample and removing the fluoride of the alkali metal from the surface of the PTFE sample.

9 Claims, 1 Drawing Sheet

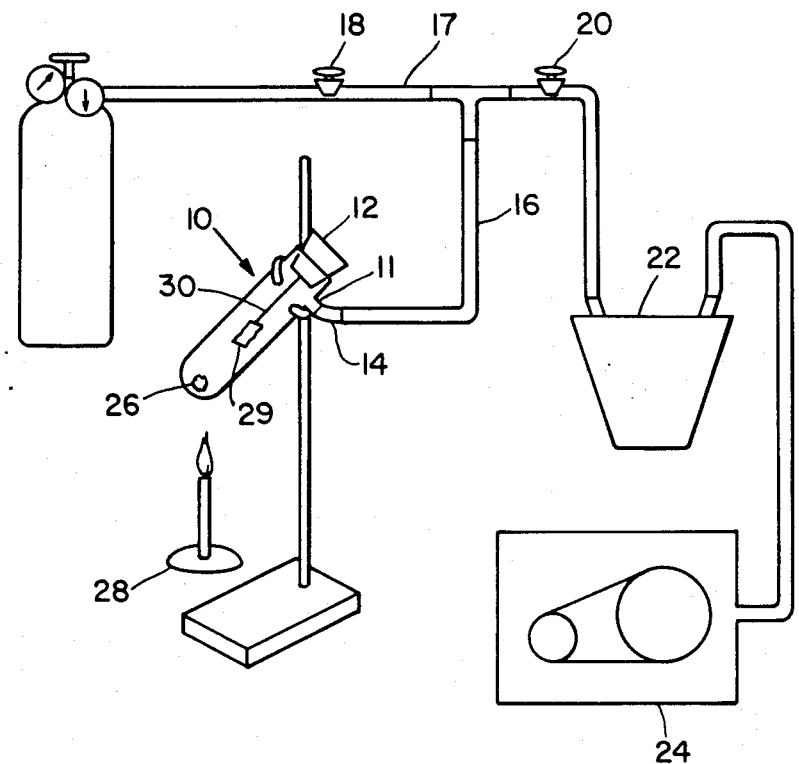

PROCESS FOR ETCHING POLYTETRAFLUOROETHYLENE

BACKGROUND OF THE INVENTION

Polytetrafluoroethylene (PTFE) is a tough, relatively inert, linear organic polymer of the monomer, $C_2F_4$ or tetrafluoroethylene (TFE), which monomer has the following formula:

The carbon atoms of the monomer have a valence of four and the fluorine atoms have a valence of one. When the atoms combine to form a $C_2F_4$ molecule, each atom acquires a complete outer shell of eight electrons. This combination of atoms results in a particularly stable, covalently bonded compound. Indeed, the carbon-fluorine bond is among the strongest known among organic compounds.

When TFE is polymerized to become the highly crystalline long chain polymer PTFE, the same stable electron configuration exists. Its stability is manifested by its chemical inertness, lubricity and unusually high melting temperature. It also has the lowest coefficient of friction of any known solid: 0.06 against polished steel. It also has one of the highest melting temperatures of any known polymer, 327° C., and is stable within a broad temperature range of about −250° C. to 260° C.

The chemical stability of PTFE makes its adhesion difficult. A PTFE surface is highly non-polar because of strong interatomic affinity. The surface atoms are electrically satisfied, so that the substrate has an unusually low surface energy of 25 $mJ/m^2$ at 25° C. Matter with such a low surface energy is not wettable and is difficult to bond in that state.

In some applications, PTFE can be mechanically bonded to the mating parts, but this method can be complex and expensive. A more practical method is to form an adhesive bond to the PTFE. Such a bond can be made possible by chemically treating the PTFE to enhance bonding power. Chemical processes can involve chemical and physical changes in a thin surface layer of about 100 A° to 100 μm of PTFE without affecting the bulk properties of the material.

One type of process to change the surface layer of PTFE is etching by which a corrosive chemical agent erodes the surface of a solid. Sodium Liquid Etching (SLE) is an established and successful technique for preparing PTFE surfaces prior to bonding. Sodium etching causes defluorination of the PTFE resulting in surface unsaturations which enhance bonding. According to this process, sodium metal chips are dissolved in a solution of ammonia, or tetrahydrofuran and naphthalene. The PTFE sample is then submerged in the solution and is allowed to react for 1-5 minutes etching a layer in the surface of the PTFE of about 1 μm. This has been shown to cause dramatic increases in surface energy, polarity, wettability and bondability of the PTFE. The new polarity increases the wettability and bonding power of PTFE. However, this process is very dangerous to use due to the highly toxic and flammable chemicals existing in the etchant solution and the large amounts of sodium necessary for the reaction.

The problems inherent in the SLE treatment of PTFE have left a need for a new method to alter the chemistry of the surface of PTFE to improve its bonding cabability.

SUMMARY OF THE INVENTION

The invention comprises a method for etching polyfluorinated polymers such as polytetrafluoroethylene (PTFE), polyvinylidene fluoride and the like by exposing such polymers to the vapors of one or more of the alkali metals, or to the vapors of one or more of the alkaline earth metals.

In a preferred embodiment, a source of an alkali metal or alkaline earth metal is placed in the bottom of a reaction chamber. The polymer is suspended above the metal sample and the reaction chamber is sealed and evacuated. After the chamber has been evacuated, the reaction chamber is heated causing the metal to vaporize. The metal is vaporized until the polymer has been coated with the vapors from the metal thereby forming a metal fluoride layer on the surface of the polymer. The metal fluoride layer is then removed from the sample by submerging the sample in water.

BRIEF DESCRIPTION OF THE DRAWING

The FIGURE is a schematic illustration of the apparatus used in the Example to etch samples of PTFE with sodium vapors.

DETAILED DESCRIPTION OF THE INVENTION

The definitions of the following terms are provided as an aid to understand the present invention.

Adhesion refers to the state in which two dissimilar bodies are held together by intimate interfacial contact such that mechanical force or work can be transferred across the interface. The interfacial forces holding the two phases together may arise from van der Waals forces, chemical bonding, or electrostatic attraction.

Wetting is the spontaneous spreading of one phase over the surface of another. Intimate interfacial molecular contact by wetting has the greatest impact on adhesive bond formation. For a given liquid and solid, there is a characteristic degree of wetting which is measured by the contact angle. This is the angle, measured through the liquid that the droplet's edge forms with respect to the surface. Wetting has a direct impact on adhesive bond strength. Good wetting increases the real area of contact, increasing the bond strength. Poor wetting gives rise to interfacial defects which decrease the strength of an adhesive bond. If an adhesive does not completely wet the adherend, interfacial voids are created. These voids result in stress concentrations when the joint is stressed, and they may become critical flaws leading to early fracture. When wetting is acheived, molecules react in several ways to form an adhesive bond. They acheive adsorptive equilibrium by moving to preferred configurations. They move across the interface to form a diffuse interfacial zone. Most importantly, the molecules may react chemically, forming chemical bonds between the two surfaces.

The surface energy of a solid is the work required to separate two of its atomic planes to an infinite distance in a vacuum. Surface energy is directly related to wettability. The lower the surface energy of a solid, the greater the tendency of a liquid to bead upon the surface of the solid resulting in a situation whereby the solid is not wettable by that liquid. Accordingly, if the solid has a higher surface energy, the liquid will tend to spread and wet the surface. As a prerequisite to bonding, the surface energy of the adhesive must be less than the adherend. This allows the adhesive to wet the solid with a reasonable area of contact.

The invention will now be further illustrated by the following examples.

EXAMPLE 1

An apparatus as shown in FIG. 1 was employed.

This apparatus includes a reaction chamber 10, which can be, for example, a Pyrex 250 ml laboratory test tube with a side arm 11. The tube is cocked to one side at an angle so that the heat melts an alkali metal placed at the bottom of tube 10 but does not affect the fixtures at the other end of tube 10. A rubber stopper 12 is fitted into the mouth of tube 10 and reinforced rubber tubing 14 is fitted to the side arm opening 11. A piece of ¼ inch Pyrex glass tubing 16 is shaped to connect the reinforced tubing 14 to a length of vacuum tubing 17. Valves 18 and 20 are Pyrex high vacuum valves. A cold trap 22 is used to condense the vaporized alkali metal before it can reach the vacuum pump 24 and contaminate the oil contained therein. All of the connections in the vacuum system are sealed with high vacuum grease. A high vacuum pump 24 connected through a gas trap 22 is used to evacuate the system. The heating mechanism for the reaction chamber is Bunsen burner 28.

The samples of polytetrafluoroethylene used in the Sodium Vapor Etching (SVE) experiments of the present example were graphite and glass filled and contained 80% PTFE. The PTFE samples were cut from 6 inch PTFE oil seals into 1 inch×0.5 inch×0.1 inch pieces. The oil seal rings had been manufactured by C.R. Industries of Elgin, Ill. A small hole was drilled through the upper area of each sample so that the sample could be held in place during the experiment. The samples were then cleaned to remove dirt, dust and oils by wiping the samples with a clean cloth and rinsing them in acetone, wiping them again, rinsing them a second time with acetone, followed by a rinse with distilled water, and air drying.

Sodium was removed from the kerosene in which it was stored and its outer surface was sliced off to remove a reddish film on the surface of the sodium metal. The remainder of the sodium was then cut into pieces of about 50 milligrams each.

A 50 mg nugget of sodium metal 26 was placed in the bottom of reaction chamber 10. PTFE sample 29 was suspended two inches above sodium nugget 26 by glass fibers 30 which were attached to stopper 12. If the PTFE sample were too close to sodium nugget 26, it would experience excessive heat transfer. If the PTFE sample were too far away from the sodium vapors, the vapors would condense on the glass wall before reaching the PTFE sample.

Reaction chamber 10 was purged using argon gas from gas supply 31. Gas valve 18 was then closed, vacuum pump valve 20 was opened and vacuum pump 24 was switched on for several minutes. This decrease in pressure allows the sodium to boil at a lower temperature than it would at atmospheric pressure. The burner 28 was turned on and the bottom of the tube was placed in the blue portion of the flame. Within 30 seconds, the sodium melted and boiled rapidly sputtering shiny flecks of metal throughout the tube. The resultant sodium vapors were allowed to rise and condense on the chamber walls and on the surface of the PTFE sample.

The temperature of the PTFE sample was measured at 85° F. using a thermocouple.

The PTFE sample was coated with sodium within about the first minute of heating the sodium from room temperature. The proper coating of sodium on the PTFE sample was obtained within about 15 seconds after the first signs of sodium vapor condensation occurring on the sample of PTFE. If etched for too long, excessive heat transfer to the PTFE caused it to char. If too short, the PTFE sample obtained only a light coating of sodium which did not sufficiently defluorinate the sample so the wettability of the sample was not increased.

When a silver-white layer of sodium had been deposited on the PTFE sample, the heat was removed and vacuum pump 24 was turned off. To avoid a violent reaction between the hot sodium metal and atmospheric oxygen, the system was vented with argon by opening gas valve 18. The system was then allowed to cool for three minutes. The PTFE was then removed from the tube. The stopper was replaced quickly and the vacuum pump turned on again to prevent excessive oxidation of the sodium remaining in the tube. The sodium fluoride which had formed on the PTFE surface was removed by submerging the sample in distilled water and agitating the PTFE sample for about 30 seconds.

Using this method, from 7-10 samples of PTFE could be etched consecutively from one 50 mg nugget of sodium.

EXAMPLE 2

Bonding tests on the sodium vapor etched samples of PTFE of this invention were performed using an Instron apparatus. Each PTFE sample was sandwiched between two aluminum heads designed to adapt to Instron apparatus.

The surfaces of aluminum heads which were to be bonded to the surface of a PTFE sample were cleaned. The aluminum surfaces were roughened with coarse sandpaper. Then both aluminum and PTFE surfaces were degreased with acetone. They were then wiped with a clean towel, rinsed in acetone, rinsed in distilled water, and air dried.

A drop of cyanoacrylate was applied on each surface of the PTFE sample which was to be bonded to the aluminum heads of the apparatus. Using a "C" clamp and an alignment block, the aluminum heads were bonded onto a sample of PTFE onto which cyanoacrylate had been placed. After two minutes the "C" clamp was removed and the resultant bonds between the aluminum heads and sample of PTFE created by the cyanoacrylate were allowed to cure for 24 hours. Ten Sodium Liquid Etched (SLE) and ten Sodium Vapor Etched (SVE) PTFE samples were prepared in this way.

The aluminum heads were then held to the Instron crossheads by ¼ inch pins. A 5000 pound load cell was used for the SLE samples, and a 250 pound load cell for the SVE ones. The crossheads were pulled apart at a speed of 0.05 inches per minute.

The adhesive bond strengths of the SVE samples varied over a broad range with the highest value being 530 psi. This value was approximately 40% of the average bond strength of the SLE samples when SLE bond strength was measured in the same way. Only portions of the etched areas seemed to stick well. The areas that had a thicker sodium coating seemed to adhere better than those with a thin layer. The edge of the sample that had been closest to the sodium nugget during etching received a thick layer. These areas were probably etched more thoroughly.

The SVE treatment increased the wettability of glass-filled PTFE samples. Contact angle measurements on the etched surfaces were inconclusive because of the varying curvature of the surface. Although quantitative measurements were impossible, a dramatic increase in wettability was observed. When the SVE treated PTFE samples were dipped in water, the water spread and remained on the surface. Previously, water beaded and rolled off the unetched PTFE samples. Even under the crude conditions of the present example, the process using sodium vapors resulted in etched PTFE samples having bonding capabilities 40% as strong as the commercially Sodium Liquid Etched samples of PTFE.

EQUIVALENTS

Those skilled in the art will recognize or be able to ascertain, using no more than routine experimentation many equivalents to the specific embodiments described herein. Such equivalents are to be covered by the following claims.

We claim:

1. A process for etching polyfluorinated polymers which comprises:
    (a) exposing said polymers to vapors of an alkali metal or alkaline earth metal to thereby form a layer of a metal fluoride on the surface of the polymer; and
    (b) removing the metal fluoride layer from the surface of the polymer.

2. A process of claim 1 wherein said polymer is polytetrafluoroethylene.

3. A process of claim 2 wherein the metal fluoride formed on the surface of the PTFE is removed by rinsing the PTFE with water.

4. A process of claim 3 wherein the metal comprised sodium.

5. A process for etching polytetrafluoroethylene (PTFE) comprising:
    (a) placing the PTFE and a source of an alkali metal into a reaction chamber;
    (b) heating the source of alkali metal to a temperature sufficient to generate vapors of the alkali metal to thereby coat the surfaces of the PTFE with a layer of an alkali metal fluoride; and,
    (c) removing alkali metal fluoride from the surface of the PTFE.

6. A process of claim 5 wherein, prior to heating the alkali metal, the reaction chamber is evacuated.

7. A process of claim 6 wherein the alkali metal fluoride is removed from the PTFE by rinsing the PTFE with water.

8. A process of claim 7 wherein the alkali metal comprises sodium.

9. A process for etching polytetrafluoroethylene (PTFE) comprising:
    (a) placing a PTFE and a source of sodium into a reaction chamber;
    (b) evacuating the reaction chamber;
    (c) heating the source of sodium whereby sodium vaporizes within the reaction chamber and coats the surface of the PTFE thereby forming a layer of sodium fluoride on the surface of the PTFE; and
    (d) removing sodium fluoride from the surface of the PTFE by rinsing it with water.

* * * * *